Fig.1

INVENTORS
WALTER J. FRISCH
WILLIAM F. ELLIOTT
BY Wheeler, Wheeler + Wheeler
ATTORNEYS May 30, 1961 W. F. ELLIOTT ET AL 2,986,226
VEHICLE HAVING PNEUMATIC BAG ROLLERS
Filed May 21, 1957 7 Sheets-Sheet 4

INVENTORS
WALTER J. FRISCH
WILLIAM F. ELLIOTT
BY
Wheeler, Wheeler + Wheeler
ATTORNEYS May 30, 1961  W. F. ELLIOTT ET AL  2,986,226
VEHICLE HAVING PNEUMATIC BAG ROLLERS
Filed May 21, 1957  7 Sheets-Sheet 7

Fig.11

INVENTORS
WALTER J. FRISCH
WILLIAM F. ELLIOTT
BY
Wheeler, Wheeler + Wheeler
ATTORNEYS United States Patent Office 2,986,226
Patented May 30, 1961

2,986,226
VEHICLE HAVING PNEUMATIC BAG ROLLERS

William F. Elliott, Clintonville, Wis., and Walter J. Frisch, Campbell, Calif., assignors to FWD Corporation, a corporation of Wisconsin Filed May 21, 1957, Ser. No. 660,598

7 Claims. (Cl. 180—23)

The invention consists of improvements in the method of driving vehicles having pneumatic bag rollers. Previous vehicles of this type were driven by means of a series of spindles resting on top of the pneumatic bags, as shown in patent application 604,136, filed August 15, 1956, and assigned to the assignee of the instant application. Previous to the present invention, difficulty was encountered with this type of drive on certain types of terrain due to loss of friction between the spindles and the bags in relation to traction between the pneumatic bags and the ground. In slippery terrain the bags were apt to become coated with mud or other liquid, greatly reducing the force that could be transmitted from the spindles to the bags.

In the present vehicle, torque is transmitted to the bags by driving wheel hubs to which the margins of the bag are securely clamped, thus giving a much more positive drive. Such a drive would normally be regarded as impractical because of the flexibility of the bags, but was found by applicants to be feasible.

The drive is further improved in that the drive shaft does not change its position during steering and tilting of the bogie upon which the bags are mounted. Applicants have, moreover, devised a drive about which the bogie may be pivoted on a vertical axis for steering and about a transverse axis for distributing the load between front and rear bags in a bogie, without the use of universal joints.

The invention further comprises novel means for supporting the wheel hubs on outboard bearings and removing them therefrom for changing the pneumatic bags when replacement is necessary. This structure keeps the bearings fully enclosed even when the wheel hub is removed and facilitates removal.

The invention further comprises a novel differential for use in the bogie which may in one position be used in the front steerable bogie and may be rotated 90° for use in the rear non-steerable bogie.

The vehicle is provided with a main frame 20 (Fig. 1) upon which a conventional cab 21 is mounted. The engine 22 is within the cab and drives through a conventional gear changing transmission 23 and universal joints 24 and drive shaft 25 to the transfer cases 26 and 27. If desired, a power take off 40 may be provided. From transfer case 27, the power goes to a conventional center differential 28 whose output shafts 29 and 30 drive the rear bogie and the front bogie respectively. From shaft 30, the power is transmitted through two universal joints 31 and shaft 32 to a right angle transfer case 33 on the front bogie whose ouput shaft 34 (Fig. 9) is aligned with the steering axis of the bogie. The power then goes to differential 35 whose output shafts 36 and 37 drive the left and right sides, respectively, of the front bogie by means of appropriate gearing contained in gear cases 38 and 39, respectively.

Figure 1:
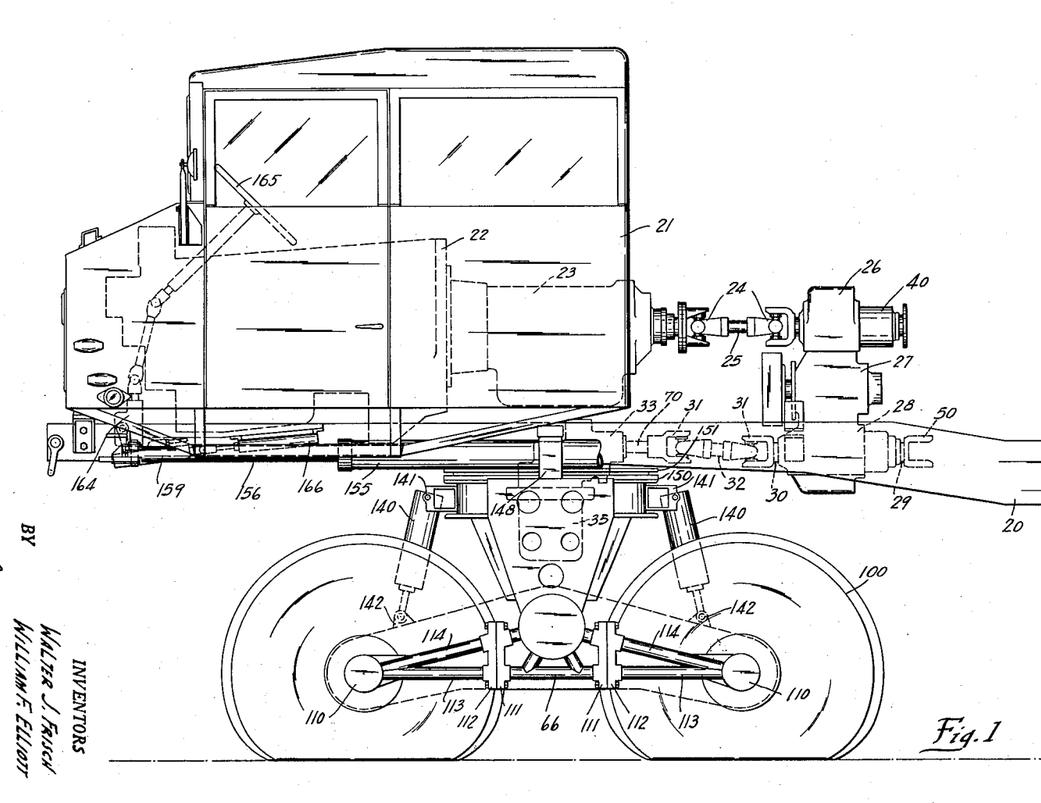
Fig. 1 is a side elevational view of the front of a cargo vehicle embodying our invention.
Figure 2:
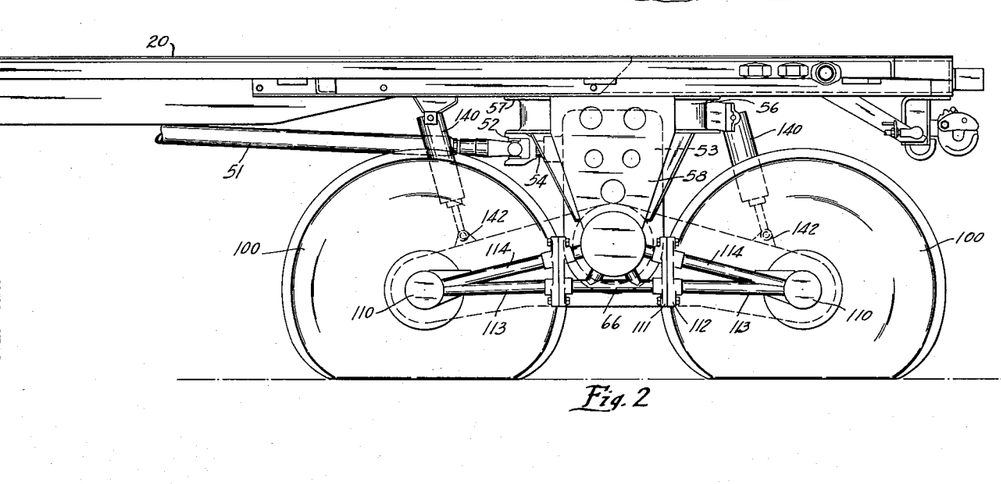
Fig. 2 is a continuation of the side elevational view of Fig. 1 showing the rear of the vehicle.

The drive of the rear bogie proceeds from shaft 29 through a conventional universal joint 50, part of which is shown in Fig. 1, to a drive shaft 51, part of which is shown in Fig. 2, and universal joint 52 to differential 53. The differential 53 is identical to differential 35 in the front bogie, but shaft 54, which corresponds to shaft 34 in the front bogie, is horizontal rather than vertical because the rear bogie is not required to pivot about a vertical axis. Lubrication of differentials 35 and 53 is provided by means of a plug 55 in the bottom wall of the differential (see Fig. 9) and a similar plug (not shown) in one of the vertical sides of the differential through which no output shaft projects. One of these plugs acts as a filler plug through which lubricant is inserted into the differential, and the other is the drain plug, the roles being reversed when the differential is rotated 90°.

Figure 4:
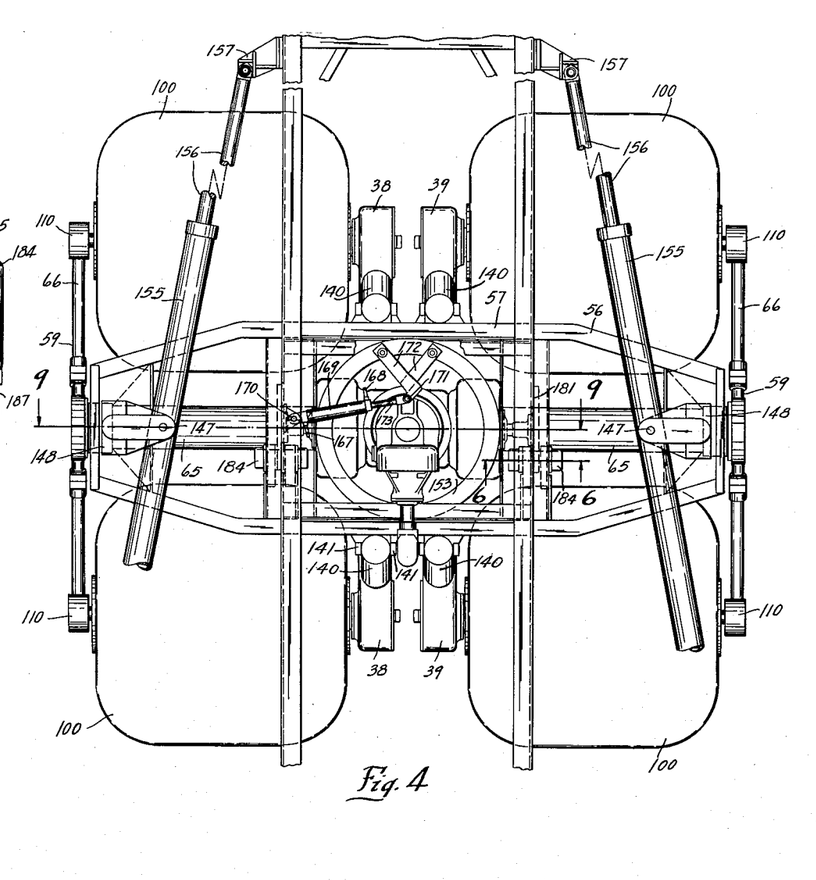
Fig. 4 is a top plan view of the front bogie of the vehicle.
Figure 5:
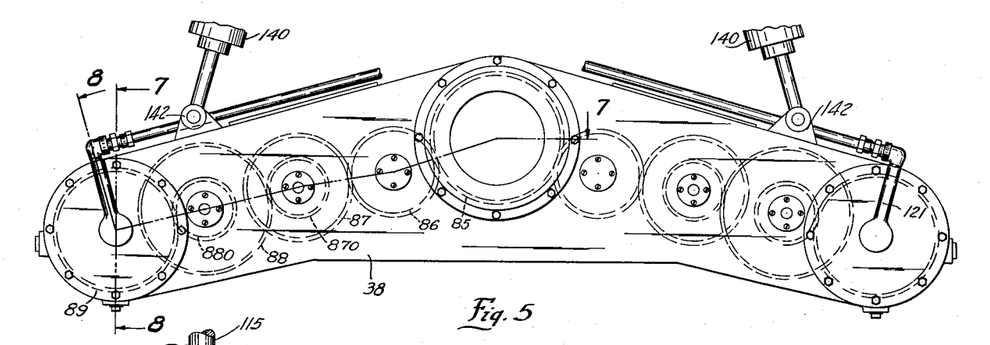
Fig. 5 is a side elevational view of one of the lower gear cases in the bogie sub-frames.

Each bogie (Figs. 4 and 9) consists of a transverse main frame 56 which is conventionally constructed of steel channels and plates, and which is provided with a top portion 57, and a vertical portion 58 which rests upon the two subframes 59 in each bogie. The top portion 57 of the rear bogie is secured rigidly to the vehicle, while the portion 57 of the front bogie is secured to the vehicle by a fifth wheel structure.

Figure 3:
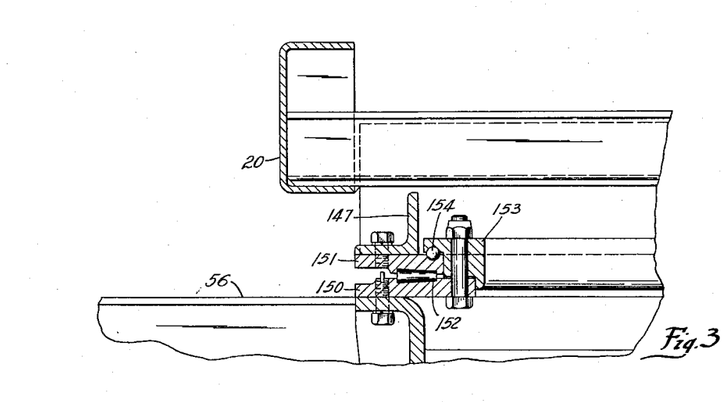
Fig. 3 is a cross sectional view showing the details of the fifth wheel structure upon which the front bogie is pivoted for steering.

The main frame of the front bogie (see Figs. 3 and 9) carries a square plate 150 on its upper surface on which a like plate 151 is rotatably journaled by means of tapered rollers 152. A reaction ring 153 is bolted to plate 150, and balls 154 form a bearing between reaction ring 153 and plate 151. Plate 151 is attached to vehicle chassis member 147, thus supporting the vehicle by a roller and ball bearing connection with members 150 and 153 on the main frame of the bogie, the axis of rotation being that of differential input shaft 34, permitting the bogie to be steered without the use of a universal joint in the drive connection.

Figures 9, 10:
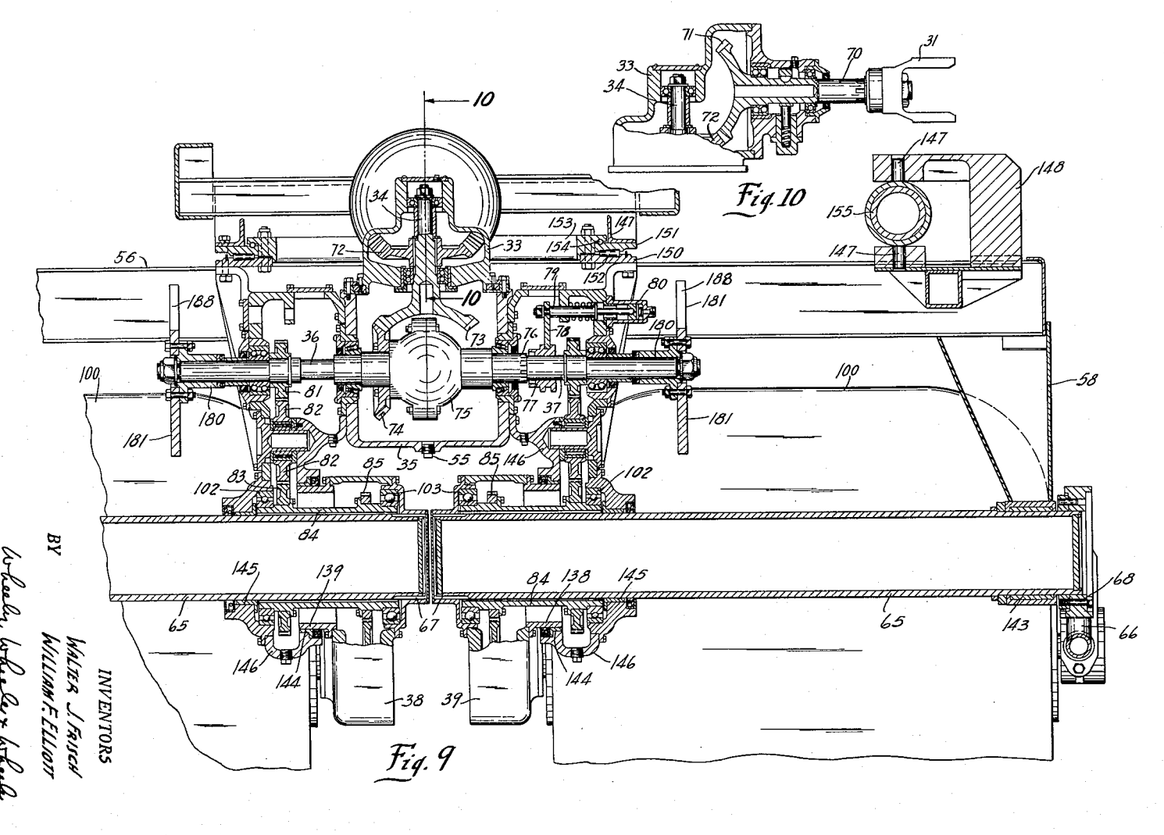
Fig. 9 is a cross sectional view on line 9—9 of Fig. 4.
Fig. 10 is a cross sectional view on line 10—10 of Fig. 9.

Each sub-frame 59 consists of a gear case 38 or 39 (Figs. 4 and 9) which is the inner structural member, a horizontal torque tube 65 which is pivotable with respect to the ends 58 of the main frame on a transverse axis, and an end frame 66 at the outer side of the bogie (Fig. 1) which, like the gear cases 38 and 39 is rigidly secured to its respective torque tube 65. As shown in Fig. 9, a preferred way to accomplish a rigid connection between the torque tubes 65 and the ends of the sub-frames 59 is by means of splines 67 at the inner ends of the torque tubes which engage the gear case 38 or 39, and by means of bolts 68 engaging a flange on the outer end of the torque tube and outer end frames 66. As shown in Fig. 9, the sub-frames 59 are journaled at their outer ends to the end plates 58 of the bogie on bearings 143, and are journaled at their inner ends to drop cases 146 by means of bearings 144 between gear cases 146 and 38 or 39, and bearings 145 between torque tubes 65 and drop case 146. Since hub 84 carrying gears 83 and 85 is rotatable about the torque tube as an axis, the sub-frame of the bogie is permitted to tilt freely with respect to the main frame 56 without changing the angle of any drive shaft, hence without universal joints.

The drive train from the rear differential to the axles of the rear bogie is identical to that in the front bogie and, accordingly, only one bogie will be described.

Power from the engine is transmitted from universal joint 31 to shaft 70, bevel gear 71 and bevel gear 72 to shaft 34 which is on the steering axis of the front bogie. Shaft 34 carries bevel gear 73 which drives the ring gear 74 of differential 35 or 53. Ring gear 74 is mounted on differential cage 75 which contains conventional differential pinion and output gears (not shown) to drive output shafts 36 and 37. A splined section 76 of the differential cage may be engaged by jaw clutch 77 keyed to output shaft 37 in order to lock out the differential action where that is desired. Jaw clutch 77 is actuated by shifting fork 78 mounted on piston rod 79 which is actuated by hydraulic cylinder 80. Hydraulic cylinder 80 is controlled by conventional valving (not shown) from the driver's compartment.

From shaft 36, the power is transmitted to gears 81, 82 and 83 in drop case 146, which form a downward progression ending with gear 83 which is bolted to hub 84, hub 84 being journaled in bearings 102, in drop case 146, and bearings 103, in gear case 38 or 39. At the other end of hub 84, gear 85 is bolted to the hub. Looking now at Fig. 7, the speed reducing drive train proceeds through gears 86, 87, 88, 870, 880 and 89. This progression is found in each half of both gear case 38 and case 39, each such progression constituting one branch of the gear train which originates in case 146. Gear 89 is keyed at 90 to shaft 91, which is in turn splined at 92 to wheel hub 93. Wheel bearings 94 and 95 are not within the wheel but are within the gear case 38 or 39 so that when wheel hub 93 is removed from shaft 91, the bearings are still protected by shaft 91 and shaft seals 96 from dirt or rough handling.

Figure 7:
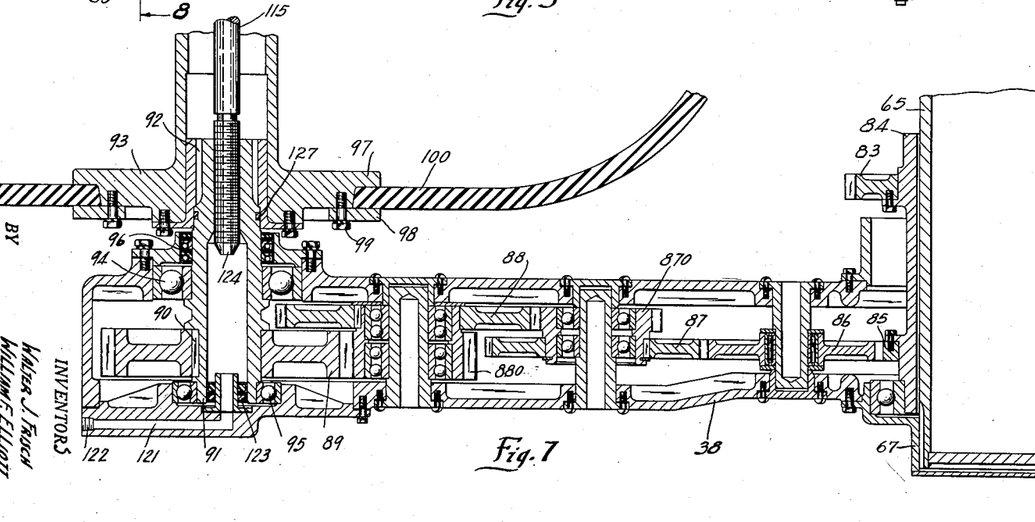
Fig. 7 is a cross sectional view on line 7—7 of Fig. 5.

Wheel hub 93 is provided with flanges 97 to which ring 98 is clamped by means of bolts 99 or other appropriate means to secure pneumatic bag 100.

Figure 8:
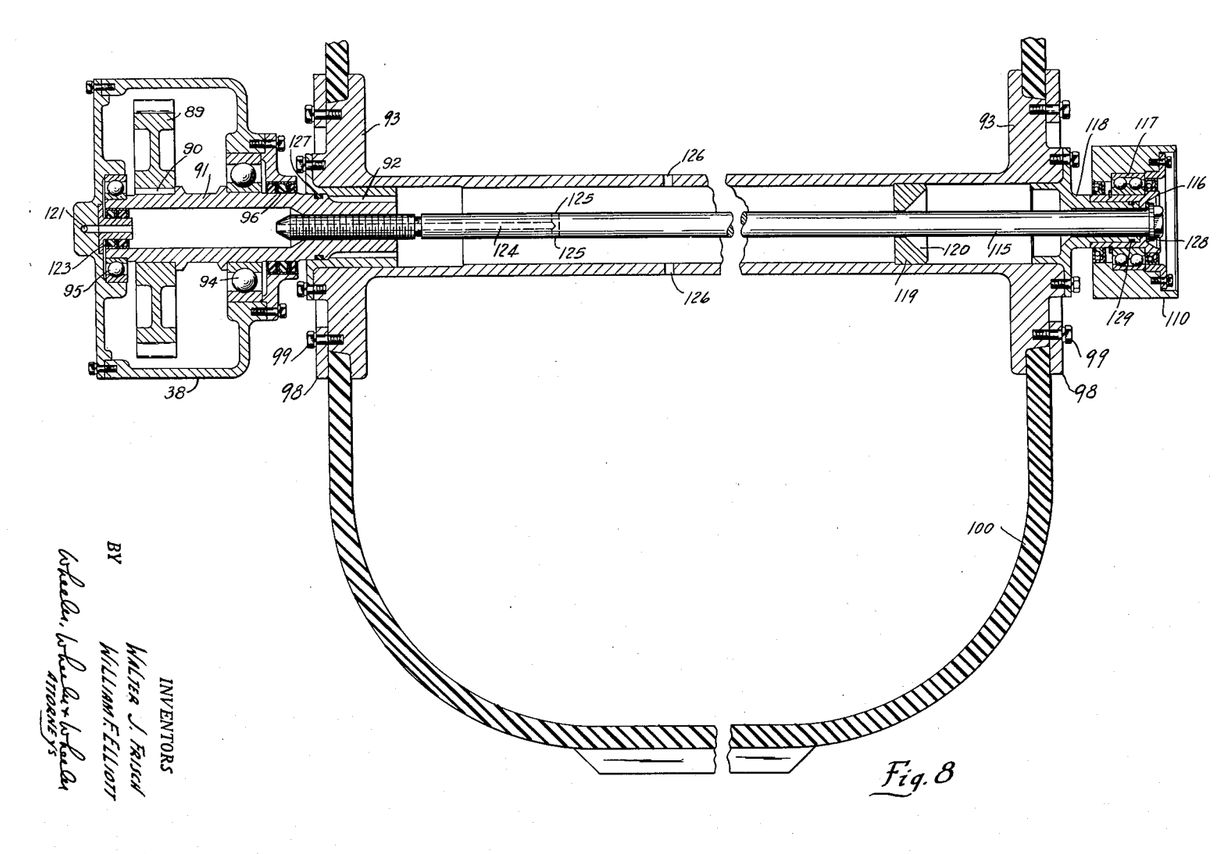
Fig. 8 is a cross sectional view on line 8—8 of Fig. 5.

The other end of the wheel hub 93 is supported in bearing cap 110, which is a part of end frame 66. Looking at Fig. 1, it will be noted that end frame 66 is made in sections provided with coupling flanges or blocks 111 and 112 which are bolted together, block 111 being permanently secured to central end frame section 66 and block 112 being integral with the frame members 113 and 114 and bearing cap 110 of an end section. Thus, bearing cap 110 may be removed from end frame 66 by unscrewing tie rod 115, removing the bolts which secure block 112 to block 111 and pulling the entire structure axially from hub 93. Before removing bearing cap 110, it is necessary for the operator to unscrew tie rod 115 from shaft 91, which he may do from the outer end of the bogie since rod 115 runs all the way through the wheel as shown in Fig. 8. The rod serves to maintain the proper distance between the gear case 38 or 39 and the end cap 110 when it is in place.

When cap 110 is removed from hub 93, annulus 116 remains inside the wheel bearing 117, thus protecting it, while annulus 118 remains secured to hub 93. The entire hub and pneumatic bag may then be slid axially a short distance to free it from shaft 91 and is then rolled away for repair or replacement with a new pneumatic bag. Annulus 119 within hub 93 has a conical indentation 120 leading to a central bore in order to facilitate inserting rod 115 and ensure that it will line up properly with shaft 91 upon reinsertion.

Air for the pneumatic bags is supplied by means of air passage 121 on gear case 38 to which conventional air fittings are screwed at 122. From passage 121, the air enters the hollow interior of shaft 91, being prevented from escaping by air seals 123. Air enters passage 124 in tie rod 115, escaping by cross passage 125 into the interior of hollow hub 93 where holes 126 admit the air to the interior of the pneumatic bag. Other air seals are provided at 127, 128 and 129 to prevent leakage. Thus, by regulating the air pressure in line 121, the air pressure in pneumatic bag 100 may be controlled at all times. Appropriate controls may be utilized either to maintain equal air pressure in all of the pneumatic bags or to inflate some of the bags more than others to suit the specific terrain over which the vehicle is moving.

The drive components from the output shaft of differential 35 or 53 to the bags are identical on the right and left sides of the bogie, the front and rear sides of gear cases 38 and 39, and in the front and rear bogies and so will not be described separately.

The sub-frames of the bogies may be tilted about the axis of torque tube 65 with respect to the main frame of the bogies by varying the air pressure in the pneumatic bags, or by the use of tilt cylinders 140. Tilt cylinders 140 are conventional hydraulic cylinders which are connected at their upper ends to brackets 141 attached to the main frame of the bogie and are attached at their lower ends to ears 142 which are integral with gear case 38 or 39. They are controlled by appropriate hydraulic connections from inside the driver's cab, which are not shown as such controls are conventional.

Figure 11:
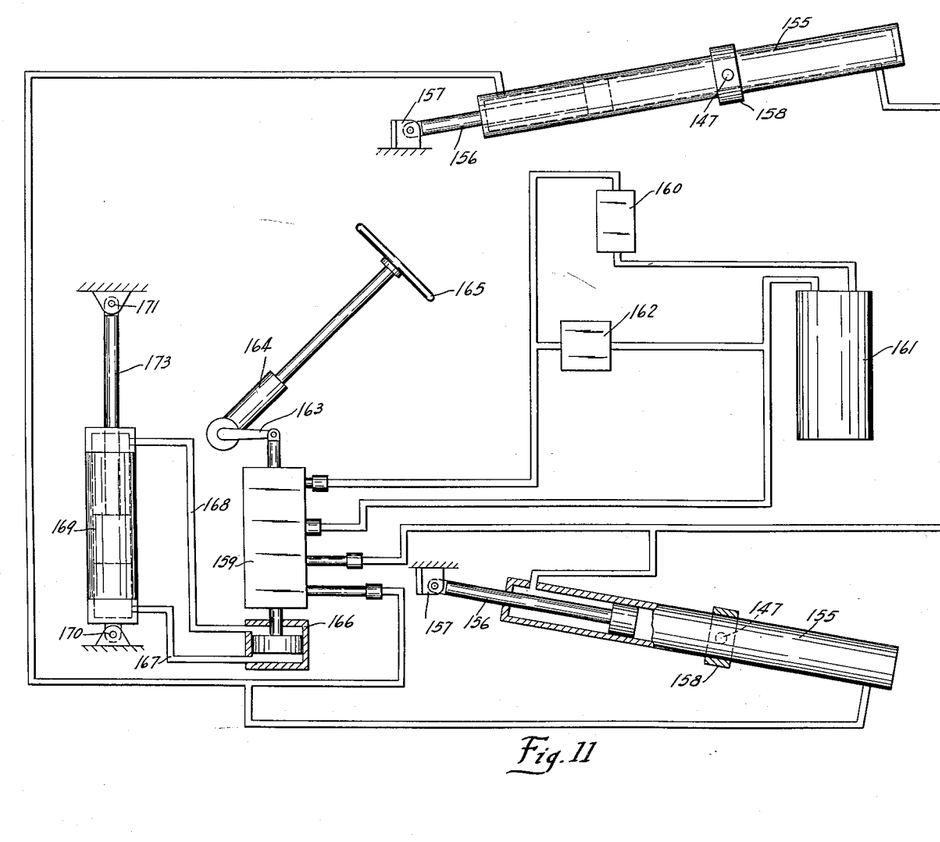
Fig. 11 is a schematic diagram of the steering system of the vehicle.

Steering is accomplished by means of hydraulic cylinders 155 (see Fig. 4) whose piston rods 156 are attached to a bracket 157 located near the forward end of the vehicle. The body of cylinder 155 is secured to yoke 158 which is pivotally secured to the main frame of the bogie by pins 147 in brackets 148 mounted on the front bogie. As shown in Fig. 11, power is applied to the opposite ends of the cylinders 155 by means of a conventional valve 159, the fluid being supplied from a pump 160 which draws fluid from a reservoir 161. When no fluid is being supplied to cylinders 155, a relief valve 162 dumps the hydraulic fluid back into the reservoir. The valve 159 is actuated by pitman arm 163 of a conventional steering gear 164 which opens the valve in one way or the other according to the direction in which steering wheel 165 is turned. A master cylinder 169 pumps fluid through hydraulic lines 167 and 168 which are connected to the ports of a slave cylinder 166. The master cylinder 169 is pivotally connected at 170 to the frame of the vehicle and its piston rod is pivotally connected at 171 to bracket 172 mounted on reaction ring 153 of the fifth wheel structure (see Fig. 4 for the mechanical structure). Bracket 172 spaces the piston rod 173 of cylinder 169 a proper distance from the center of rotation of the bogie. Thus, as the bogie is turned, cylinder 169 drives fluid through lines 167 or 168 to the cylinder 166, the connection being such that the body of the valve 159 is driven in a direction to close the valve, that is to say, the body of valve 159 will be driven in the same direction that pitman arm 163 has previously moved the movable element. Unless the operator continues to turn the steering wheel, steering effort will cease to be exerted on steering cylinders 155 and the bogie will remain in its adjusted position until valve 159 is again actuated by means of steering gear 164.

Figure 6:
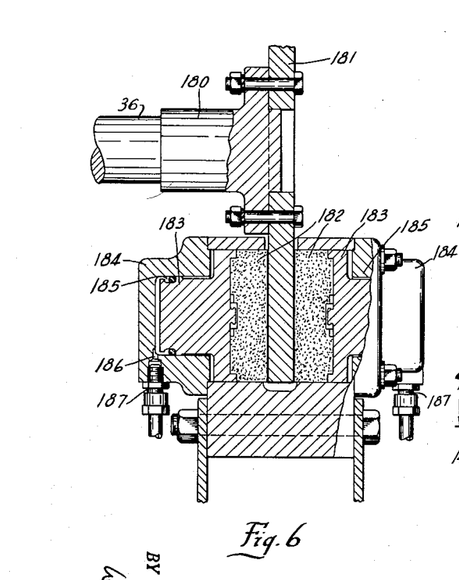
Fig. 6 is a cross sectional view of one of the brakes of the vehicle generally on line 6—6 of Fig. 4.

The brakes of the vehicle are shown in Figs. 6 and 9. The differential output shafts 36, 37 each terminates in a hub 180 to which is bolted a brake disk 181. Disk 181 rotates between brake shoes 182 which are secured to opposed pistons 183. Housing 184 contains cylinders 185 in each side, each of which is provided with an inlet passage 186 supplied by conventional fittings 187 with hydraulic fluid to actuate the brake. No means is provided for retracting pistons 183 inasmuch as the very slight normal wobbling of disk 181 sufficiently disengages the shoes from the disk in the absence of fluid pressure. Brake disk 181 has slots 188 at intervals to increase the flow of cooling air. These slots also provide a space into which dirt may be wiped from the surface of the disk by shoes 182, the dirt then being thrown clear radially due to centrifugal force. It has been found by extensive testing that this structure results in a very clean brake disk despite the absence of any housing around the brake, it being desirable to dispense with the housing in order to permit free access of cooling air. The efficiency of the brake is further enhanced by the fact that it is separated by the speed reducing gear train from the wheel hubs of the vehicle so that it rotates at a speed considerably greater than that of the pneumatic bag. Thus, braking torque as well as engine torque is multiplied in the drive train to the pneumatic bags and the greater speed of the brake disk promotes cooling.

We claim:

1. A wheeled vehicle comprising a rotatable wheel hub, a pneumatic bag tire in air-tight connection with said hub, a removable vehicle support at one side of said hub containing a hub bearing, a driving connection housing on the other side of said hub containing a driving gear, a stub shaft on which said driving gear is secured, vehicle supporting bearings in said driving connection housing, said stub shaft being rotatably journaled upon said vehicle supporting bearings, one end of said stub shaft being in rotatable supporting and driving connection with said hub, a tie rod aligned with the axis of rotation of said wheel hub and releasably connected to said stub shaft and said removable vehicle support for axial removal in the direction of said removable vehicle support, said tie rod being provided with means to releasably fix the axial distance between said removable vehicle support and said driving connection housing, said removable vehicle support being removable by movement in the same axial direction as required for removal of said tie rod, said vehicle being provided with another wheel hub and pneumatic bag tire spaced laterally from said above wheel hub and pneumatic bag tire, said direction of removal of said tie rod and said removable vehicle support being away from said laterally spaced wheel hub and tire.

2. The device of claim 1 further comprising a pneumatic bag in airtight connection with said hub, said stub shaft, said vehicle hub and said tie rod being in non-rotatable airtight connection with one another and said stub shaft being provided with a duct having an axial opening, said stub shaft having a rotatable airtight connection with said driving connection housing, said housing having an air supply duct opening into said axial opening of said stub shaft through said rotatable connection, said tie rod having a passage therethrough in communication with the passage in said stub shaft, said wheel hub being provided with a passage in communication with the passage in said tie rod and with the interior of said pneumatic bag, whereby to supply air to said pneumatic bag.

3. A vehicle of the character described comprising a bogie having a main frame and a sub-frame, means for pivotally mounting the main frame from the sub-frame, said means including a driving-connection housing, driving connections in the housing, wheel means in supporting relation to the sub-frame for carrying the bogie main frame, the wheel means including a pair of axially spaced hubs, tire mounting means on the hubs, supporting bearings lying outside of the respective hubs, the hubs having supporting members journaled in said bearings, one of said members having a splined connection with its hub and being in driven connection with said driving connections, means extending through the wheel means from one of said supporting members to the other, and detachably tying said supporting members together, the supporting member at the side of the wheel means opposite said driving connection housing including a separable portion in which its respective bearing is mounted, whereby the detachment of said separable portion and the withdrawal of said tie means releases the said hubs and wheel means for disconnection from said driving connections.

4. A vehicle provided with a steerable bogie, said bogie comprising a main frame rotatable about a vertical axis, at least one sub-frame rotatable to a limited degree about a transverse axis with respect to said vehicle, at least one pneumatic carrying wheel hub associated with each said sub-frame, a pneumatic bag on each said hub, said bogie being provided with a drive train from the power source of the vehicle to said wheel hub comprising a first element which is rotatable upon the axis of rotation of the main frame of said bogie and a second element rotatable on the axis of rotation of each sub-frame of said bogie, each said sub-frame comprising a gear case which supports the vehicle from one side of a said wheel hub, said case containing said second element, and each said sub-frame further comprising support means on the other side of a said wheel hub aligned with said gear case, a stub shaft releasably secured to the hub of the wheel, bearings on said stub shaft which support said vehicle on said hub, said support means aligned with said gear case being provided with a second bearing upon which said vehicle is supported, said support means comprising a fixed portion and a removable portion, said second bearing being a part of said removable portion, and a tie rod extending from said removable bearing through said hub and engaging said stub shaft to maintain a fixed distance between said removable bearing and said stub shaft, said tie rod being provided with means at the end of the rod adjacent said stub shaft releasable solely by manipulation of the other end of said rod.

5. In a vehicle having a chassis, a steerable bogie comprising a main frame and a unitary rigid subframe journaled for limited oscillation on a transverse axis with respect to the main frame and provided with at least one wheel, said wheel being adapted to receive a pneumatic bag tire, said vehicle being provided with a source of power, a drive train to the wheel, said drive train including a vertical drive shaft coaxial with the steering axis of the bogie, a train of gears, at least one of said train of gears being rotatable on transverse axis coaxial with the axis upon which said subframe is oscillatable and another of said train of gears being rotatable on an axis coaxial with the axis of the wheel, said subframe comprising a torque tube having its axis transverse to the vehicle, a gear case rigidly secured to one end of said torque tube containing a portion of said train of gears, a supporting frame secured to the other end of said torque tube, bearing means in said case and said supporting frame, and a wheel hub rotatably journaled between said bearing means, said wheel hub being removable, said vehicle further comprising protective members fixedly associated with said bearing means and intervening between said bearing means and said wheel hub, said members being separable from said hub to remain associated with said bearing means upon removal of said hub whereby to protect said bearing means at all times.

6. In a vehicle, a chassis, a steerable bogie comprising a main frame journaled for steering oscillation on a vertical axis, and at least one rigid subframe journaled on the main frame for limited oscillation on a transverse axis with respect to the main frame, said subframe including spaced vehicle supports rigidly connected by a torque tube concentric with said transverse axis of oscillation, a pair of longitudinally spaced wheels between said vehicle supports, pneumatic bag tires on said wheels, and bearings between each said wheel and said vehicle supports at each end of each said wheel, said vehicle further comprising a source of power, a drive train including a longitudinally branched train of gears, one of said gears being journaled on said torque tube for rotation and another said gear being rotatable on the axis of rotation of each said wheel and in driving connection therewith.

7. The device of claim 6 in which each said wheel is removable in its entirety, and in which said gear rotatable on the axis of rotation of a said wheel is between said wheel and said bearings in said vehicle support, said vehicle being supported through said driving connection between said wheels and said gears.

References Cited in the file of this patent

UNITED STATES PATENTS

| | | |
|---|---|---|
| 2,215,506 | Hollmann et al. | Sept. 24, 1940 |
| 2,219,533 | Ross | Oct. 20, 1940 |
| 2,374,196 | Harbers | Apr. 24, 1945 |
| 2,435,021 | Seider | Jan. 27, 1948 |
| 2,802,541 | Albee | Aug. 13, 1957 |

FOREIGN PATENTS

| | | |
|---|---|---|
| 160,254 | Australia | Dec. 14, 1954 |
| 287,383 | Great Britain | Mar. 22, 1928 |
| 412,358 | Great Britain | June 28, 1934 |